(12) United States Patent
Yazawa et al.

(10) Patent No.: US 8,342,649 B2
(45) Date of Patent: Jan. 1, 2013

(54) PRINTING APPARATUS AND PRINTING METHOD

(75) Inventors: Takeshi Yazawa, Yokohama (JP); Yuji Konno, Kawasaki (JP); Satoshi Seki, Kawasaki (JP); Hinako Iritani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/205,842

(22) Filed: Aug. 9, 2011

(65) Prior Publication Data

US 2012/0044297 A1 Feb. 23, 2012

(30) Foreign Application Priority Data

Aug. 20, 2010 (JP) ................................. 2010-185198

(51) Int. Cl.
*B41J 2/21* (2006.01)
(52) U.S. Cl. .................. 347/43; 347/40; 347/41
(58) Field of Classification Search .................. 347/5, 9, 347/12, 14, 15, 19, 40, 41, 42–43, 49, 54, 347/56, 57
See application file for complete search history.

(56) References Cited

U.S. PATENT DOCUMENTS

| | | | |
|---|---|---|---|
| 6,764,154 B2 | 7/2004 | Nishikori et al. | |
| 6,827,413 B1 | 12/2004 | Kawatoko et al. | |
| 7,287,830 B2 | 10/2007 | Ide et al. | |
| 7,377,619 B2 * | 5/2008 | Takahashi et al. | 347/43 |
| 7,862,149 B2 | 1/2011 | Yasutani et al. | |
| 7,903,280 B2 | 3/2011 | Yazawa et al. | |
| 2011/0069100 A1 | 3/2011 | Yasutani et al. | |
| 2012/0081461 A1 * | 4/2012 | Kakutani | 347/43 |

FOREIGN PATENT DOCUMENTS

JP 2005-177992 A 7/2005

* cited by examiner

*Primary Examiner* — Thinh Nguyen
(74) *Attorney, Agent, or Firm* — Fitzpatrick, Cella, Harper & Scinto

(57) ABSTRACT

A printing apparatus and a printing method are provided by which, when an image is printed by a plurality of printing modes using different printing elements, a plurality of printing elements can have an equalized use frequency to thereby maintain the uniformity of quality of the printed image. In a first multipath printing control, a use rate of a nozzle group that is not used in the first multipath printing control and that is used in a second multipath printing control is higher than that of a nozzle group that is used in the first and second multipath printing controls.

9 Claims, 13 Drawing Sheets

FIG.12A

REGION A/(REGION A+REGION B)

| | RANK 3 | RANK 4 |
|---|---|---|
| | RANK 1 | RANK 2 |
| RANK 0 | | |

→ REGION A

FIG.12B

| RANK | PRINTING RATE | | | |
|---|---|---|---|---|
| | FIRST NOZZLE GROUP | SECOND NOZZLE GROUP | THIRD NOZZLE GROUP | FOURTH NOZZLE GROUP |
| 0 | 25% | 25% | 25% | 25% |
| 1 | 28% | 28% | 22% | 22% |
| 2 | 30% | 30% | 20% | 20% |
| 3 | 33% | 33% | 17% | 17% |
| 4 | 35% | 35% | 15% | 15% |

FIG.12C

REGION B/(REGION A+REGION B)

| | RANK 3 | RANK 4 |
|---|---|---|
| | RANK 1 | RANK 2 |
| RANK 0 | | |

→ REGION B

FIG.12D

| RANK | PRINTING RATE | | | |
|---|---|---|---|---|
| | FIRST NOZZLE GROUP | SECOND NOZZLE GROUP | THIRD NOZZLE GROUP | FOURTH NOZZLE GROUP |
| 0 | 25% | 25% | 25% | 25% |
| 1 | 22% | 22% | 28% | 28% |
| 2 | 20% | 20% | 30% | 30% |
| 3 | 17% | 17% | 33% | 33% |
| 4 | 15% | 15% | 35% | 35% |

FIG.13A
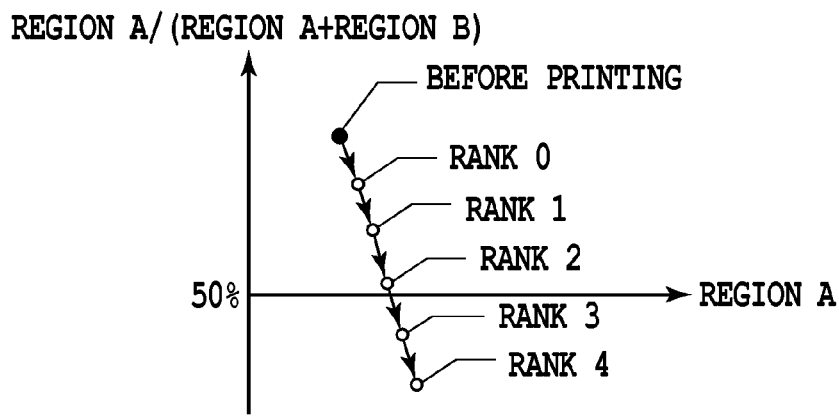
FIG.13B
| RANK | PRINTING RATE | | | |
|---|---|---|---|---|
| | FIRST NOZZLE GROUP | SECOND NOZZLE GROUP | THIRD NOZZLE GROUP | FOURTH NOZZLE GROUP |
| 0 | 25% | 25% | 25% | 25% |
| 1 | 28% | 28% | 22% | 22% |
| 2 | 30% | 30% | 20% | 20% |
| 3 | 33% | 33% | 17% | 17% |
| 4 | 35% | 35% | 15% | 15% |
FIG.13C
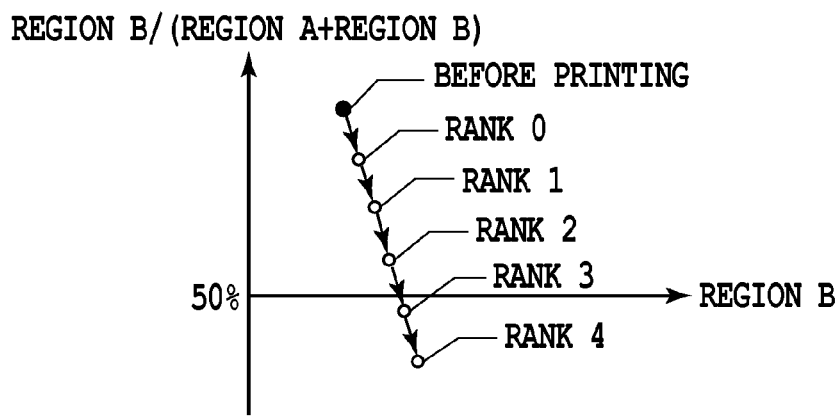
FIG.13D
| RANK | PRINTING RATE | | | |
|---|---|---|---|---|
| | FIRST NOZZLE GROUP | SECOND NOZZLE GROUP | THIRD NOZZLE GROUP | FOURTH NOZZLE GROUP |
| 0 | 25% | 25% | 25% | 25% |
| 1 | 22% | 22% | 28% | 28% |
| 2 | 20% | 20% | 30% | 30% |
| 3 | 17% | 17% | 33% | 33% |
| 4 | 15% | 15% | 35% | 35% |

PRINTING APPARATUS AND PRINTING METHOD

BACKGROUND OF THE INVENTION

1. Field of the Invention

The present invention relates to a printing apparatus and a printing method by which a printing head having a plurality of printing elements that can apply color material to a printing medium can be used to print an image by a plurality of printing modes.

2. Description of the Related Art

As an ink jet printing apparatus, a serial-type printing apparatus has been used that uses a printing head in which many nozzles (printing elements) including ejection ports and liquid paths are arranged to print an image. In the serial-type printing apparatus, an image is printed on a printing medium by alternately repeating the printing scanning in the main scanning direction of the printing head and the transport operation of the printing medium in the sub-scanning direction. In the printing apparatus as described above, such an image printing is required that is stable in various factors such as color formation, gradation, and uniformity. The image uniformity in particular is easily influenced by factors caused in the step of manufacturing a printing head such as a slight variation among nozzles or the dirt around the ejection ports of the respective nozzles. Owing to the variation among the nozzles as described above, there is a possibility that the amount of ink ejected through the respective nozzles or the ejection directions therefrom are unstable, thus density unevenness of a printed image may be caused. When a so-called multipath printing method is used according to which a single printing region is printed by a plurality of scannings by a printing head, a printed image can be prevented from having uneven density by reducing the influence by the variation among the nozzles. However, the use of the multipath printing method as described above causes a declined printing speed due to the increased number of scannings by the printing head. In recent years, such a printing apparatus has been generally used that has a plurality of printing modes so as to be able to select one path printing method or a printing operation using a multipath printing method having a reduced number of paths, and a printing operation using a multipath printing method having an increased number of paths. In the printing apparatus as described above, a user can select a printing method depending on an image quality and a printing speed.

In the case of a multipath printing method such as a 4-path printing method, four mask patterns having a complementary relationship to one another are generally used to thin out a printed image. Each of these four mask patterns has a 25% culling rate (printing rate). Thus, a 100%-image is printed through four printing scannings based on the printing data thinned-out by the four mask patterns.

Japanese Patent Laid-Open No. 2005-177992 discloses a printing apparatus that uses mask patterns having not-equal printing rates. For example, a mask pattern corresponding to nozzles at both ends of a nozzle array has a lower printing rate and a mask pattern corresponding to a nozzle at one end of the nozzle array has an increased printing rate. Thus, when such a mask pattern is used that has printing rates that are not equal and that are uneven, there is a possibility that a nozzle part corresponding to the mask pattern having a high printing rate has a high number of ink ejections and thus the nozzle part may be deteriorated sooner than in the case of other nozzles. To prevent this, in Japanese Patent Laid-Open No. 2005-177992, another mask pattern having printing rates that are uneven in an inverted manner is prepared. Thus, the two mask patterns are alternately used depending on each printing scanning to suppresse the early deterioration of a specific nozzle. For example, when one mask pattern has a high printing rate corresponding to the nozzle at an end of the nozzle array, the other test pattern is arranged to have a low printing rate corresponding to the nozzle at the end of the nozzle array so that these test patterns are alternately used depending on each printing scanning.

Image printing modes in a printing apparatus include a mode in which a nozzle to be used (to-be-used nozzle) and a nozzle not to be used (not-to-be-used nozzle) are fixedly set in a nozzle array. For example, two nozzle arrays in the printing head are divided those nozzles in an upstream-side half region in the transport direction of the printing medium (upstream-side nozzles) and those nozzles in a downstream-side half region in the transport direction (downstream-side nozzles). Then, during the first printing scanning by the printing head, the first ink is ejected through the upstream-side nozzles in one of the two nozzle arrays. Then, during the second printing scanning after the transport operation of the printing medium, the second ink is ejected through the downstream-side nozzles of the other nozzle array so as to coat the printing region applied with the first ink. When not-to-be-used nozzles are fixedly set in the nozzle array as described above, such a mask pattern cannot be used that has an inverted printing rate for each printing scanning. Thus, a to-be-used nozzle and a not-to-be-used nozzle cannot have a similar deterioration level among the nozzles in the respective nozzle arrays.

When the printing mode where a not-to-be-used nozzle is fixedly set and the printing mode where a not-to-be-used nozzle is not fixedly set are carried out in one printing apparatus, a difference in the deterioration among nozzles caused by the former printing mode has an influence on the latter printing mode. Specifically, a difference in the deterioration among nozzles caused by the former printing mode causes the resultant imaged by the latter printing mode to have not-uniform qualities, thus there is a possibility the uniformity is damaged.

SUMMARY OF THE INVENTION

The present invention provides a printing apparatus and a printing method according to which, when an image is printed by a plurality of printing modes using different printing elements, the use frequencies of the plurality of printing elements can be equalized to thereby maintain the ununiformity of quality of the printed image.

In the first aspect of the present invention, there is provided a printing apparatus including a plurality of printing modes using different printing elements used to print an image in which, while a printing head having a plurality of printing elements and a printing medium are being allowed to move relative to each other, color material is applied from the printing elements to the printing medium to print the image, wherein the plurality of printing modes include:

a first printing mode in which the image is printed using a first combination of a plurality of printing elements among the plurality of printing elements; and a second printing mode in which the image is printed using a second combination of a plurality of printing elements includind a first printing element belonging to the first combination and a second printing element not belonging to the first combination, and in the second printing mode, the second printing element has a higher use rate compared to the first printing element.

In the second aspect of the present invention, there is provided a printing method including a plurality of printing modes using different printing elements used to print an image in which, while a printing head having a plurality of printing elements and a printing medium are being allowed to move relative to each other, color material is applied from the printing elements to the printing medium to print the image, wherein the plurality of printing modes include:

a first printing mode in which the image is printed using a first combination of a plurality of printing elements among the plurality of printing elements; and a second printing mode in which the image is printed using a second combination of a plurality of printing elements includind a first printing element belonging to the first combination and a second printing element not belonging to the first combination, and in the second printing mode, the second printing element has a higher use rate compared to the first printing element.

According to the present invention, in the second printing mode, the second printing element that is not used in the first printing mode and that is used in the second printing mode has a higher use rate than that of the first printing element used in the first printing mode and the second printing mode. This can consequently allow the plurality of printing elements to have an equalized use frequency, thus printing an image having a uniform quality.

Further features of the present invention will become apparent from the following description of exemplary embodiments (with reference to the attached drawings).

BRIEF DESCRIPTION OF THE DRAWINGS

FIG. 12A, FIG. 12B, FIG. 12C, and FIG. 12D illustrate the relation between a printing history and a mask pattern printing rate in the third embodiment of the present invention; and FIG. 13A, FIG. 13B, FIG. 13C, and FIG. 13D illustrate the relation between the printing history and an assumed printing history after the next printing in the fourth embodiment of the present invention.

DESCRIPTION OF THE EMBODIMENTS

The following section will describe embodiments of the present invention based on the drawings. The present invention can be applied to an ink jet printing apparatus of a so-called serial scan method.

(First Embodiment)

Figure 1:
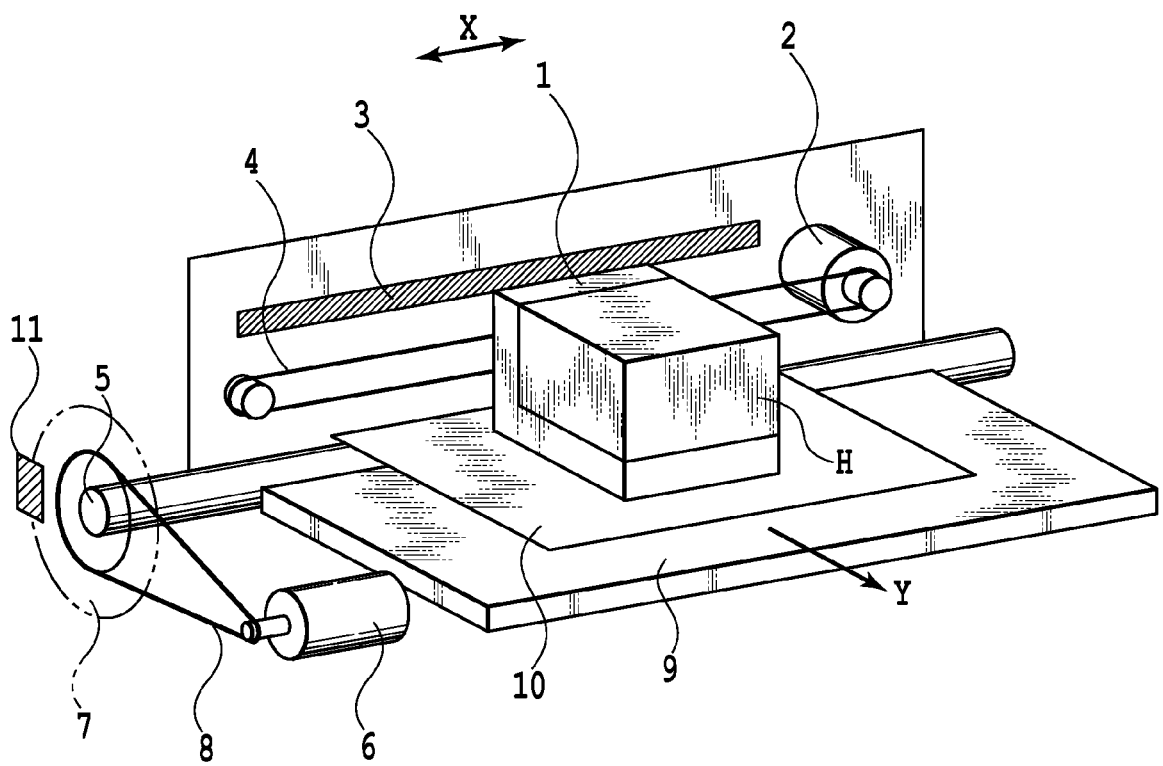
FIG. 1 is a schematic perspective view illustrating a printing apparatus in the first embodiment of the present invention.

FIG. 1 is a schematic perspective view illustrating a configuration example of an ink jet printing apparatus to which the present invention can be applied.

The rotation of a carriage motor 2 is transmitted via a belt 4 to a carriage 1, thereby allowing the carriage 1 to reciprocate on a chassis 9 in a main scanning direction shown by an arrow X. The position to which the carriage 1 is moved is detected based on a detection signal from an encoder sensor 3A at the carriage 1-side (see FIG. 2) opposed to a linear encoder (the detection indicates a relative displacement amount between the linear encoder 3 and the encoder sensor 3A). A printing medium 10 is transported in a sub-scanning direction shown by an arrow Y by the rotation of a transport roller 5 caused via a belt 8 by driving force of a transport motor 6. The sub-scanning direction crosses the main scanning direction (or is orthogonal to the main scanning direction in this example). The transport amount of the printing medium 10 is detected based on a detection signal from an encoder sensor 11 opposed to a rotary encoder 7 attached to the transport roller 5 (the detection indicates a relative displacement angle between the rotary encoder 7 and the encoder sensor 11). Based on the detection signal from the encoder sensor 11, the transport motor 6 can be controlled to thereby control the transport amount of the printing medium 10 depending on the rotation amount of the transport roller 5.

The carriage 1 is detachably mounted with an ink jet printing head H. The printing head H includes therein a plurality of nozzles (printing elements) that are arranged in a direction crossing the main scanning direction (or being orthogonal to the main scanning direction in this example). The respective nozzles can eject ink from an ejection port at a tip end of the nozzle, the ink being supplied from an ink tank (not shown). The nozzle includes an ejection energy generating element for generating ink ejection energy. The ejection energy generating element can be, for example, an electric thermal conversion element (heater) or a piezo element. When the ejection energy generating element is an electric thermal conversion element, ink can be foamed by the heat generated therefrom to use the foaming energy thereof to eject ink through the ejection port. In order to print an image on the printing medium 10, a printing scanning and a transport operation are repeated alternately. In the printing scanning, the ink is ejected from the printing head H while allowing the carriage 1 to move in the main scanning direction along with the printing head H. In the transport operation, the printing medium 10 is transported in the sub-scanning direction by a predetermined amount. Then, the ink ejected through nozzles is applied onto the printing medium 10 to form dots, thereby forming the image.

Figure 2:
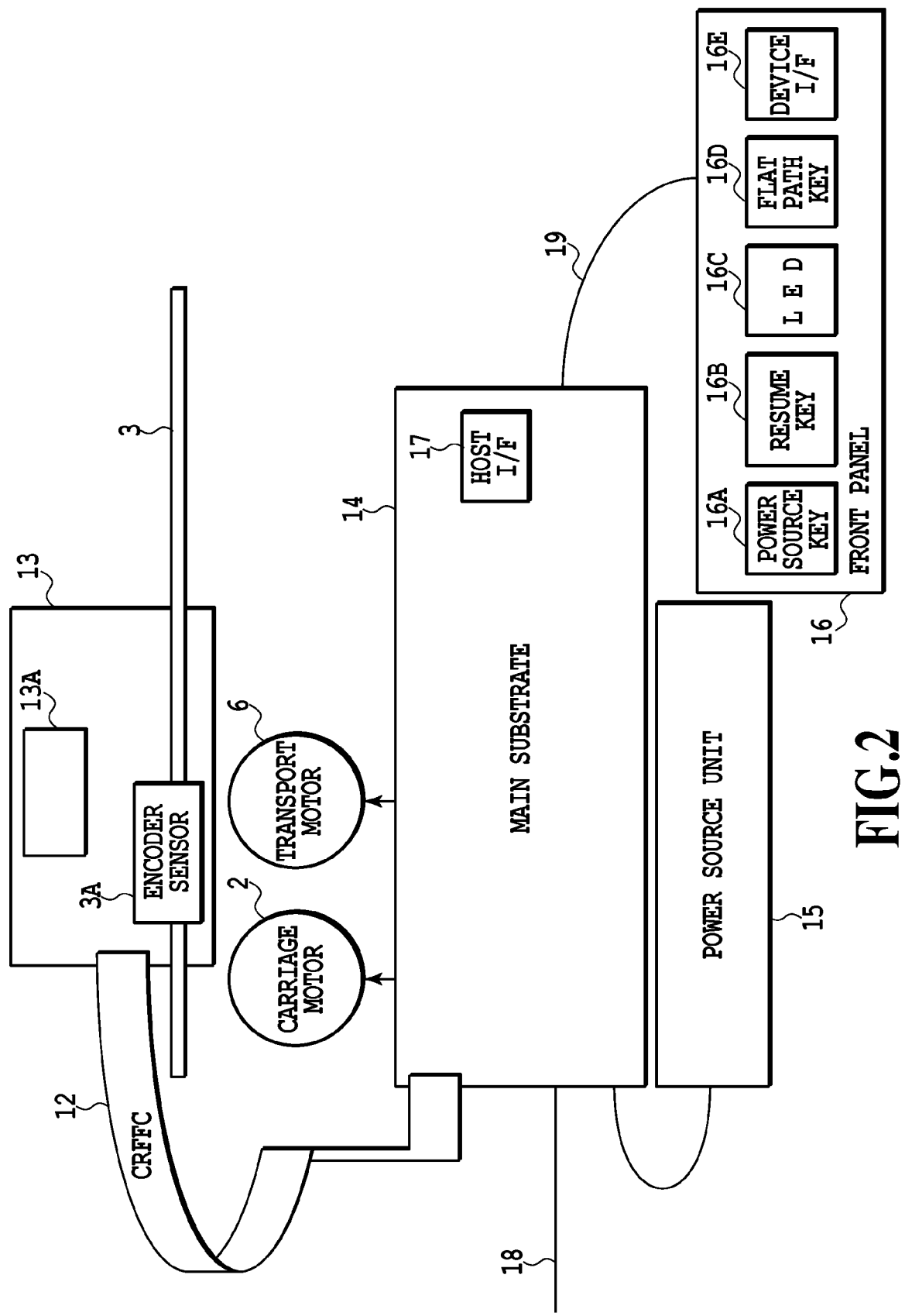
FIG. 2 is a configuration diagram of an electric circuit of the printing apparatus of FIG. 1.

FIG. 2 is a schematic block configuration diagram illustrating a control system in the printing apparatus of FIG. 1. The control system of the printing apparatus of this example is mainly composed of: a carriage substrate 13; a main substrate 14; a power source unit 15; and a front panel 16 for example. The power source unit 15 is connected to the main substrate 14 to supply various driving powers. The carriage substrate 13 is a print substrate unit mounted on the carriage 1. The carriage substrate 13 is configured to receive, via a head connector 13A and a flexible flat cable (CRFFC) 12, a signal from the printing head H and to supply the driving force for the printing head. Based on the pulse signal outputted from the encoder sensor 3A in accordance with the travel of the carriage 1, a change in the positional relation between the linear encoder 3 and the encoder sensor 3A is detected. The output signal from the encoder sensor 3A is outputted to the main substrate 14 via the flexible flat cable (CRFFC) 12.

The main substrate 14 is a print substrate unit that provides the driving control of the respective parts of the printing apparatus. The main substrate 14 controls the printing operation based on the data received from a host computer (host apparatus) (not shown) via a host interface 17 on the substrate. The main substrate 14 is connected to various motors such as the carriage motor 2 or the transport motor 6. Various sensors for detecting the operation statuses of the respective parts of the printing apparatus (e.g., encoder sensor 11) are connected to a signal line 18 that provides the transmission and reception of a control signal and a detection signal. The main substrate 14 is connected to the CRFFC 12 and the power source unit 15 and also includes an interface that allows the front panel 16 to receive information via a panel signal line 19. The front panel 16 includes a power source key 16A, a resume key 16B, an LED 16C, a flat path key 16D, and a device interface 16E for example.

Figure 3:
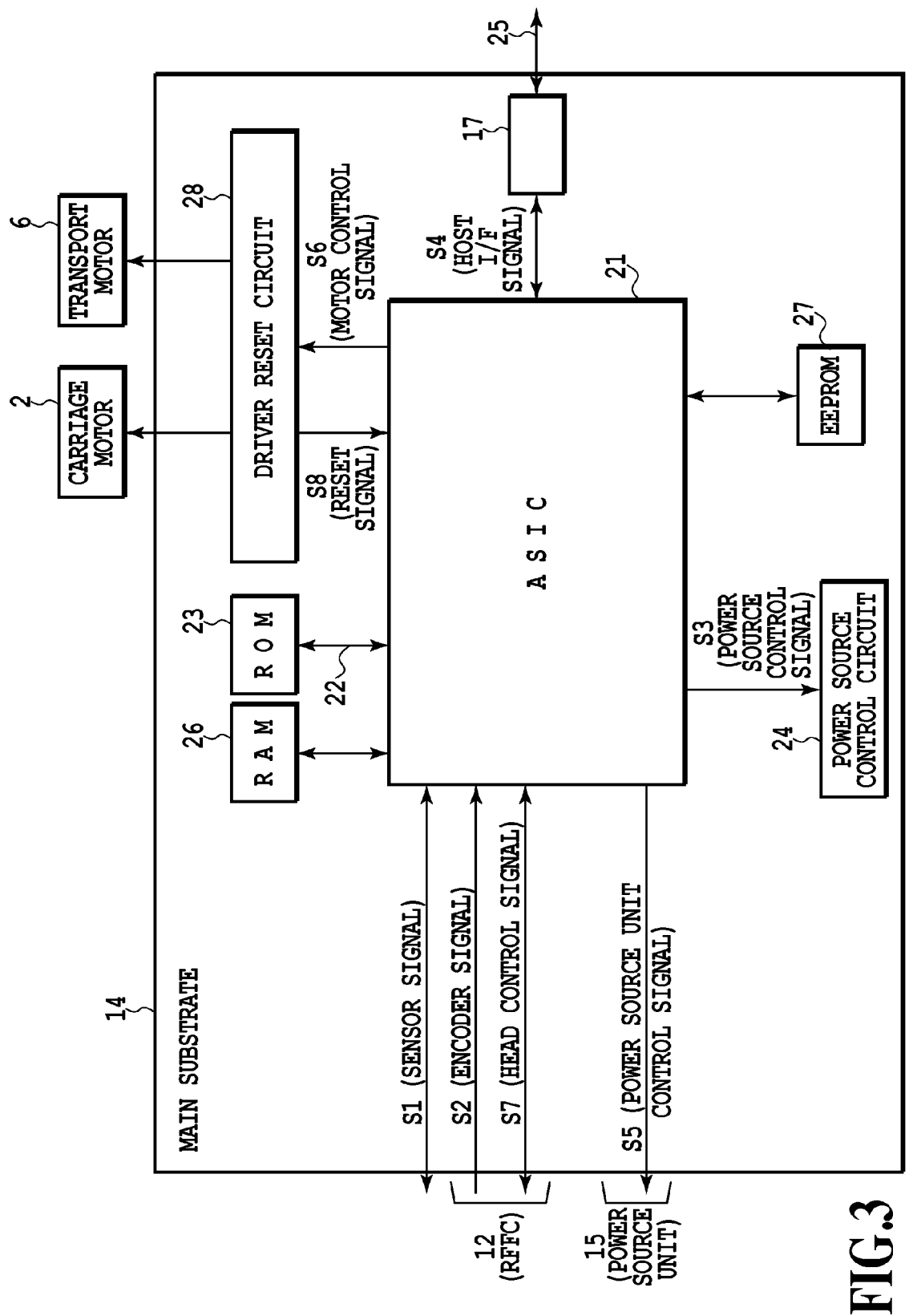
FIG. 3 is a schematic block configuration diagram of a main substrate in FIG. 2.

FIG. 3 is a block diagram illustrating the internal configuration of the main substrate 14 in this example.

In FIG. 3, the reference numeral 21 denotes an Application Specific Integrated Circuit (ASIC) that is connected via a control bus 22 to the ROM 23 and that provides various controls based on a program stored in the ROM 23. For example, the ASIC 21 provides the transmission and reception of a sensor signal S1 related to various sensors and detects the status of an encoder signal S2 for example. The ASIC 21 performs various logical operations or conditional judgments for example depending on the connection of the host interface and a data input status to control the respective configuration elements to thereby control the printing apparatus. The reference numeral 24 denotes a power source control circuit that controls, based on a power source control signal S3 from the ASIC 21, the power supply to the respective sensors having light-emitting elements for example. The host interface 17 transmits a host interface signal S4 from the ASIC 21 to a host interface cable 25 connected to the outside and transmits signals from the cable 25 to the ASIC 21. Electric power is supplied from the power source unit 15 (see FIG. 2). The supplied electric power is subjected to a voltage conversion as required before being supplied to the respective parts at the inside or the outside of the main substrate 14. A power source unit control signal S5 from the ASIC 21 is inputted to the power source unit 15 and controls a low power consumption mode of the printing apparatus for example.

The ASIC 21 is a semiconductor integrated circuit including a one-ship computation apparatus that outputs a motor control signal S6, the power source control signal S3, and the power source unit control signal S5 for example. The ASIC 21 receives signals from the host interface 17 and controls various sensors through the sensor signal 51 to sense the statuses thereof. The ASIC 21 also senses the status of the encoder signal (ENC) S2 to generate a timing signal and uses the head control signal S7 to control the printing operation of the printing head H. The encoder signal (ENC) S2 is an output signal from the encoder sensor 3A that is inputted through the CRFFC 12. A head control signal S7 is inputted to the carriage substrate through the flexible flat cable 12 and is supplied to the printing head H via the head connector 13A, and transmits various pieces of information from the printing head H to the ASIC 21.

In the drawing, the reference numeral 26 denotes a DRAM that is also used as a printing data buffer or a reception buffer for the data from the host computer for example and is also used as a work area required for various control operations. The reference numeral 27 denotes an EEPROM that stores therein information such as a printing history and calls such information as required. The ASIC 21 monitors the head control signal S7 to thereby count dot ejection signals transmitted to the printing head for each nozzle and stores such a numerical value obtained by calculating the accumulation, as a printing history, to the EEPROM 27. The ASIC 21 can call the value as required to switch the control. The reference numeral 28 denotes a driver reset circuit. The reference numeral S8 denotes a reset signal.

In this embodiment, an image is printed by the so-called multipath printing method according to which the printing to a single scanning region on a printing medium is completed by a plurality of printing scannings. The printing apparatus of this example can provide a plurality of printing controls including the first multipath printing control and the second multipath printing control (the first printing mode and the second printing mode).

(First Multipath Printing Control (First Printing Mode))

Figure 4:
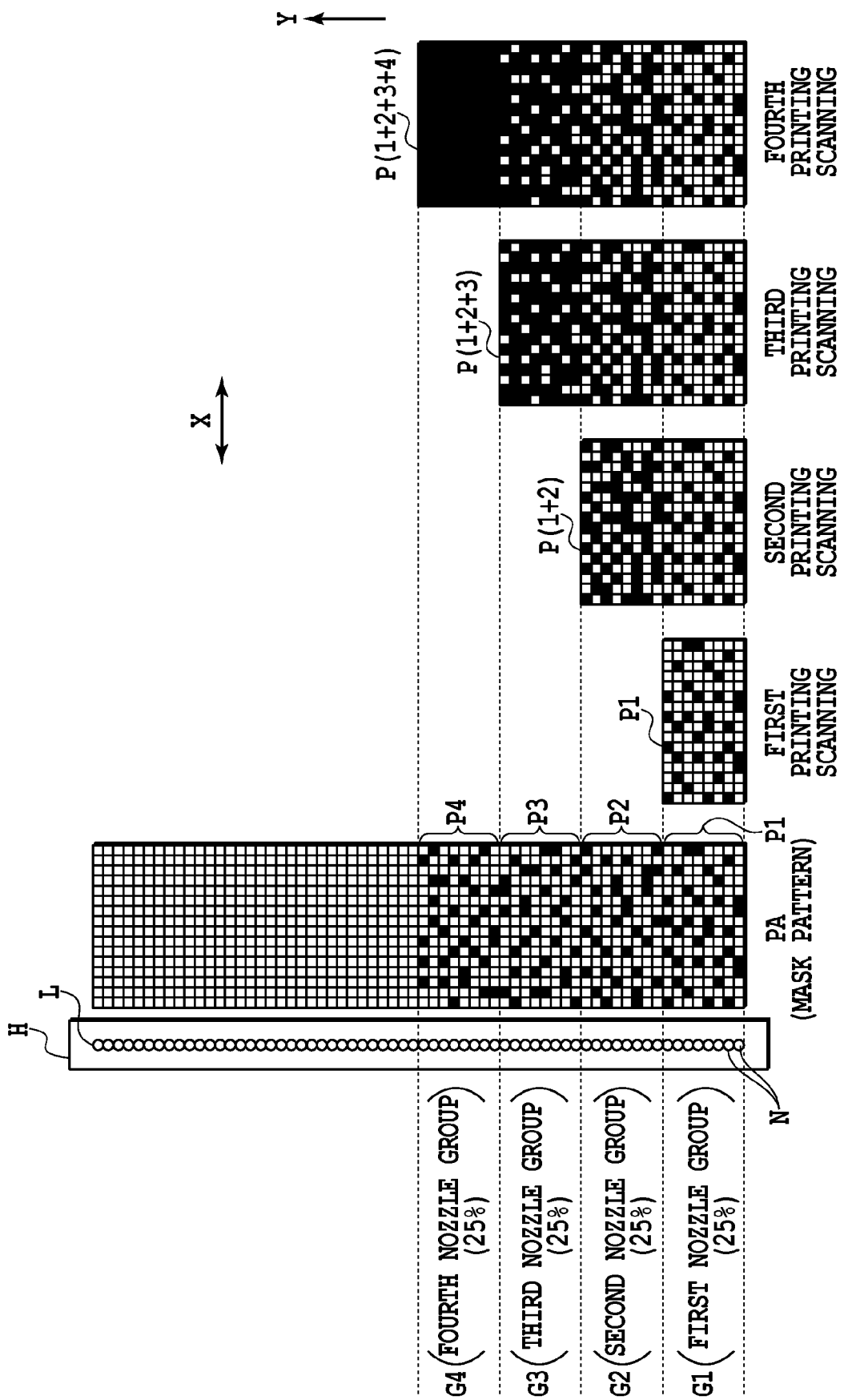
FIG. 4 illustrates a color ink mask pattern in the first multipath printing control.
Figure 5:
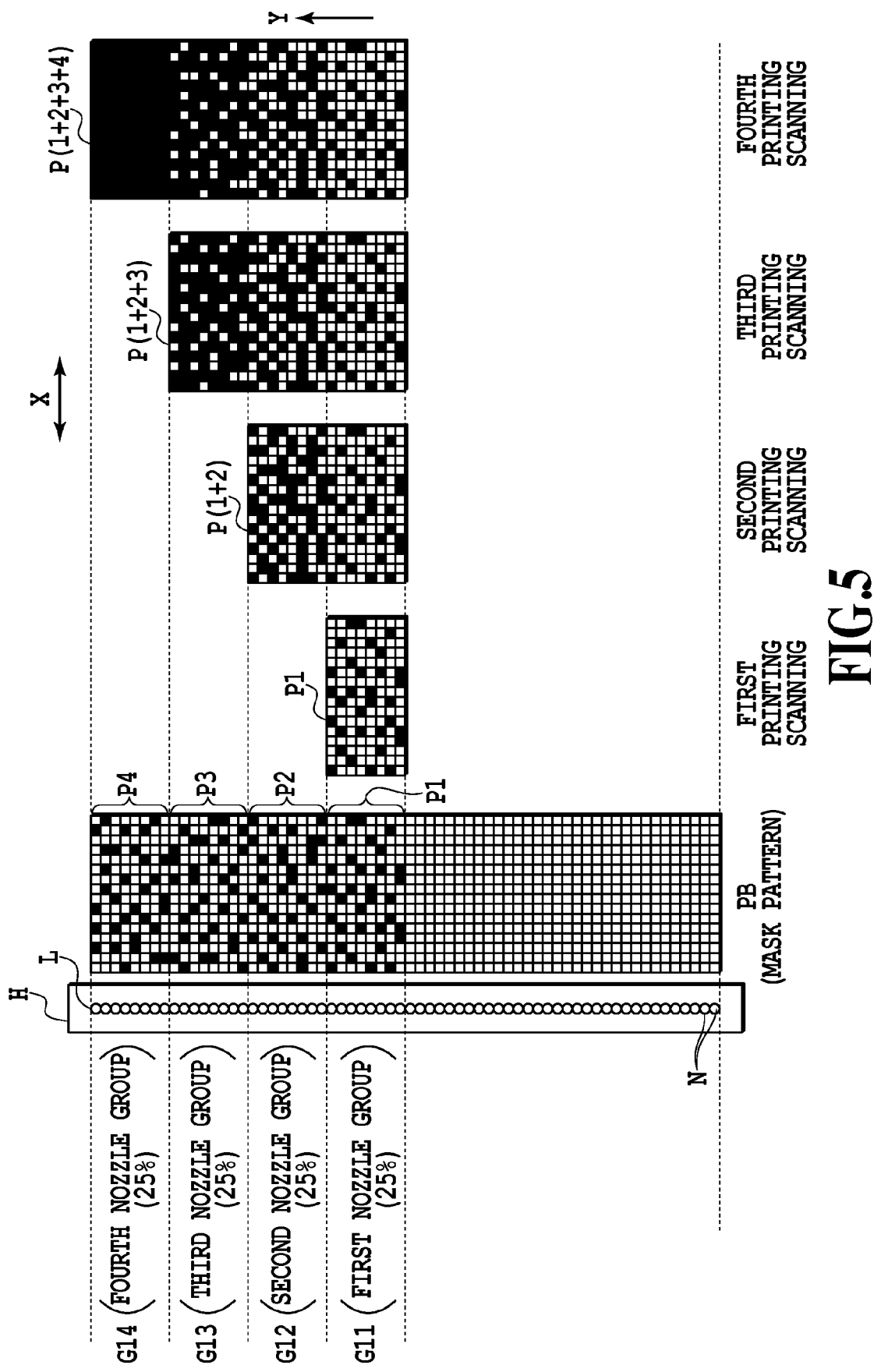
FIG. 5 illustrates a clear ink mask pattern in the first multipath printing control.

FIG. 4 and FIG. 5 are schematic views illustrating a printing head and a mask pattern (printing pattern) to explain the first multipath printing control among the plurality of printing controls. The printing head H applied to this embodiment has many nozzles (e.g., 768 nozzles) N. However, the following section will describe the printing head H as having 64 nozzles for simplicity. In this example, the nozzle arrays L are arranged in 7 rows, respectively, to eject the total of the corresponding 7 types of inks including six types of color inks (cyan, magenta, yellow, light cyan, light magenta, and black) and clear ink not including color material. These nozzle arrays form a plurality of printing element groups that can apply ink to a printing medium. FIG. 4 is a schematic view illustrating the mask pattern used for the printing by color inks. FIG. 5 illustrates the mask pattern used for the printing by the clear ink.

In FIG. 4, the nozzle array L includes four divided nozzle groups of the first to fourth nozzle groups G1 to G4. Each nozzle group is composed of 8 nozzles N. The mask pattern PA is composed of the first to fourth mask patterns P1 to P4. The first to fourth mask patterns P1 to P4 correspond to the areas that can be subjected to the printing by the first to fourth nozzle groups G1 to G4, respectively. In the mask pattern PA, the black areas show a printing-permitted area and the white areas show a printing-prohibited area. The mask patterns P1 to P4 have a complementary relation to one another. These four mask patterns are configured so that, when these four mask patterns are superimposed, the four mask patterns complete the printing of a region corresponding to 8×16 areas. In color ink printing control shown in FIG. 4, the 32 nozzles at the downstream side in the printing medium transport direction are not used to print the image.

In FIG. 5, the nozzles N are similarly divided so as to form four nozzle groups of the first to fourth nozzle groups G11 to G14. Each of the nozzle groups is composed of 8 nozzles. The mask pattern PB is configured so that, when the four mask patterns of the first to fourth mask patterns P1 to P4 are superimposed, the printing of a region corresponding to 8×16 areas is completed. Thus, in the clear ink printing control shown in FIG. 5, the 32 nozzles at the upstream side in the printing medium transport direction are not used to print the image.

Thus, the image is printed by combining the color ink printing control and the clear ink printing control as described above. As a result, on a single printing region (a region corresponding to the width of each nozzle group) on a printing medium, an image by color inks can be completed by the four printing scannings and an image by clear ink can be completed by the subsequent four printing scannings. Specifically, the image by color inks is printed by a total of 8 printing scannings and then the image can be overcoated with clear ink. As described above, in the first multipath printing control (the first printing mode), among the total of 64 nozzles, the 32 nozzles (the first combination of a plurality of printing elements) continuing at the upstream side in the printing medium transport direction (lower side in FIG. 4) are used.

(Second Multipath Printing Control (Second Printing Mode))

Figure 6:
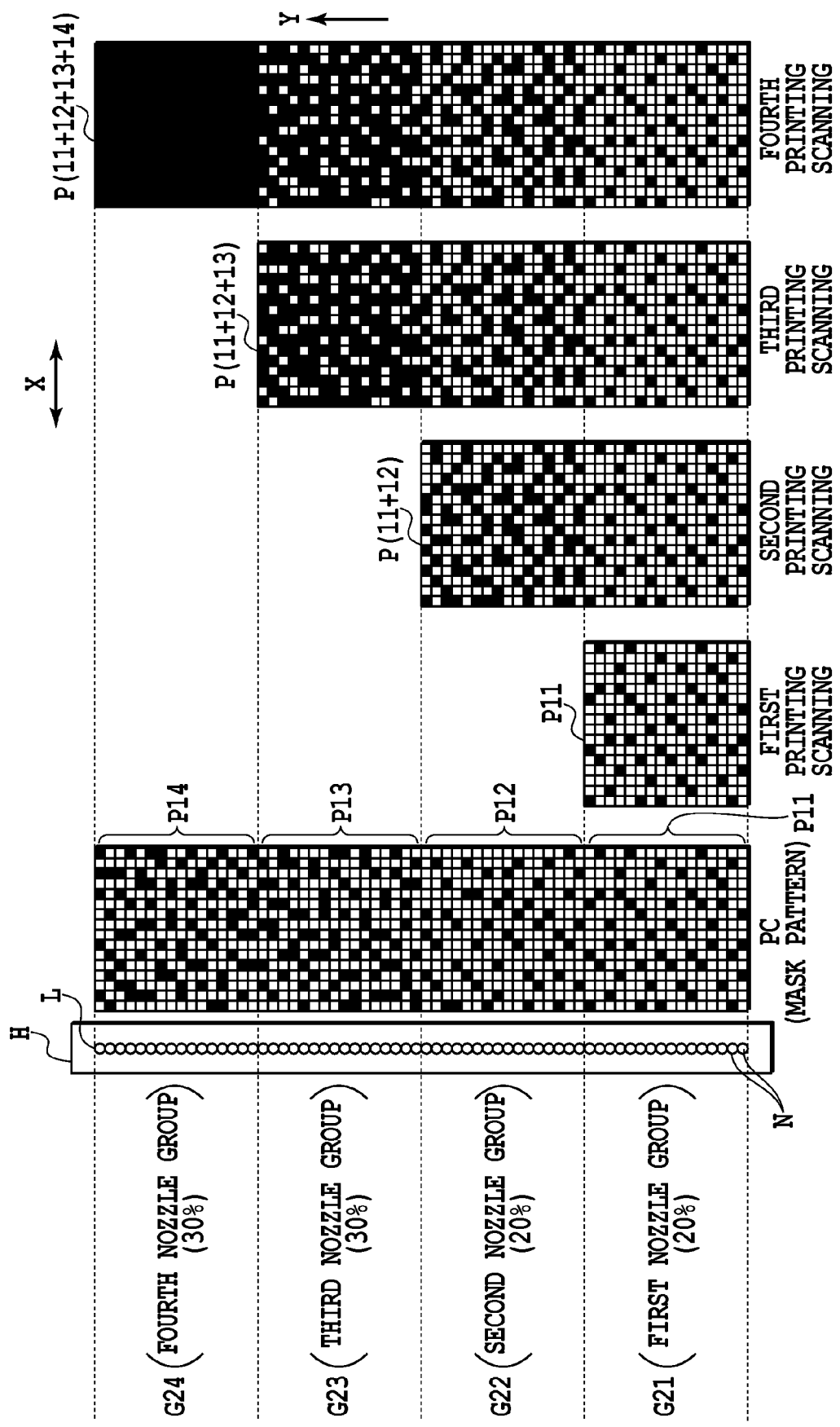
FIG. 6 illustrates the color ink mask pattern in the second multipath printing control.
Figure 7:
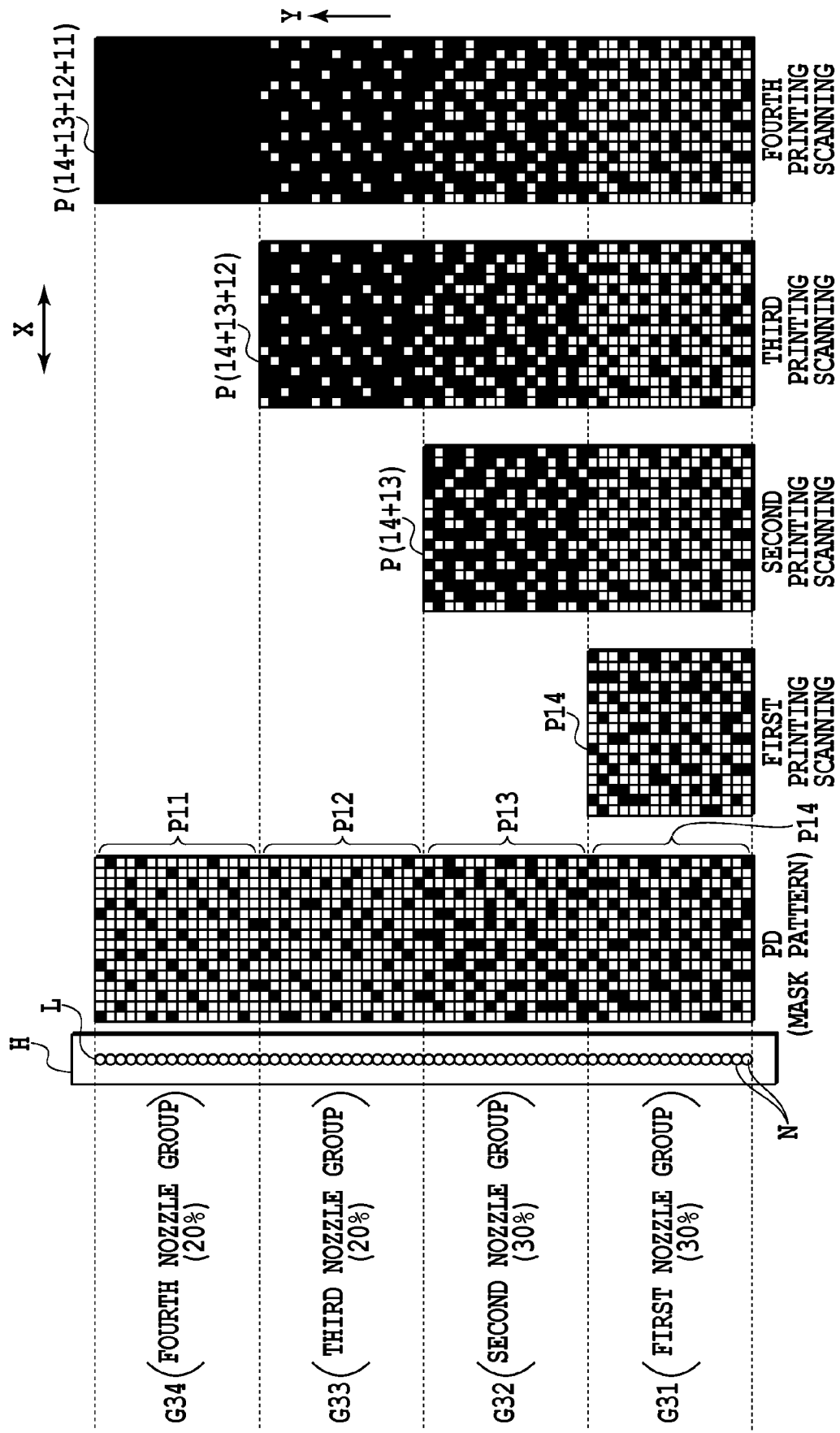
FIG. 7 illustrates the clear ink mask pattern in the second multipath printing control.

FIG. 6 and FIG. 7 are schematic views illustrating the second multipath printing control that is the other one of the plurality of printing controls owned by the printing apparatus. FIG. 6 illustrates the mask pattern used for the color ink printing. FIG. 7 illustrates the mask pattern used for the clear ink printing.

In FIG. 6, the nozzles N are divided to the first to fourth four nozzle groups G21 to G24. Each nozzle group is composed of 16 nozzles N. The first to fourth mask patterns P11 to P14 have a complementary relation to one another. The mask pattern PC is configured so that, when these four mask patterns P11 to P14 are superimposed, a region corresponding to 16×16 areas is completed. In contrast with the color ink printing control shown in FIG. 4, the mask pattern PC in FIG. 6 is set so that all of the 64 nozzles (the second combination of a plurality of printing elements) are used to print the image. As described above, the predetermined number of nozzles (the first combination of a plurality of printing elements) used for the first multipath printing control (the first printing mode) are continuously arranged in a direction along which the nozzles are arranged. On the other hand, the nozzles (the second combination of a plurality of printing elements) used for the second multipath printing control (the second printing mode) that is in a higher number than the above predetermined number are arranged in a direction along which the nozzles are arranged. Furthermore, the third and fourth nozzle groups G23 and G24 that correspond to nozzles (the second printing elements) not used in the printing control of FIG. 4 have a printing rate of 30%. Furthermore, in the printing control shown in FIG. 6, the first and second nozzle groups G21 and G22 that correspond to the nozzles (the first printing elements) used in the printing control of FIG. 4 have a printing rate of 20%.

In FIG. 7 showing the clear ink mask pattern, the nozzles N are divided to the first to fourth four nozzle groups G31 to G34. The first to fourth mask patterns P11 to P14 have a complementary relation to one another. The mask pattern PD is configured so that, when these four mask patterns P11 to P14 are superimposed, the printing of a region corresponding to 16×16 areas is completed. In contrast with the clear ink printing control of FIG. 5, the mask pattern PD in FIG. 7 is set so that all of the 64 nozzles (the second combination of a plurality of printing elements) are used for to print the image. Furthermore, the first and second nozzle groups G31 and G32 that correspond to the positions of the nozzles (the second printing elements) not used in the printing control of FIG. 5 have a printing rate of 30%. Furthermore, in the printing control shown in FIG. 7, the third and fourth nozzle groups G334 and G34 that correspond to the positions of the nozzles (the first printing elements) used in the printing control of FIG. 5 have a printing rate of 20%.

(Mask Pattern Determination Method)

Figure 8A:
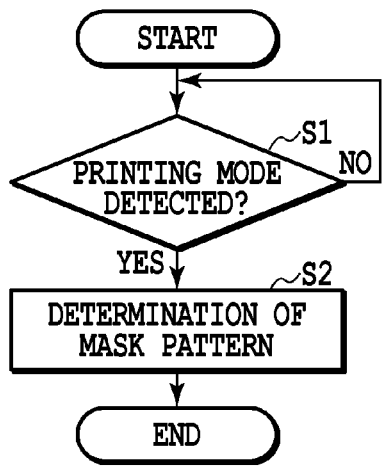
FIG. 8A, FIG. 8B, and FIG. 8C are flowcharts illustrating a mask pattern determination method in the first, third, and fourth embodiments of the present invention, respectively.

FIG. 8A is a flowchart for explaining the mask pattern determination method. When the printing apparatus receives printing data, then the printing apparatus in Step S1 determines whether the printing mode is detected or not based on the header information of the printing data. The printing mode is generally determined by the combination of the type of the printing medium and the printing quality required for the printed image for example. The printing mode includes a mode to execute the above-described first and second multipath printing controls. When the printing mode as described above is detected, a mask pattern specified in advance is called in Step S2 depending on the printing mode and is determined. When the printing mode for executing the above-described first multipath printing control is detected, the mask patterns PA and PB are determined. When the printing mode for executing the above-described second multipath printing control is detected on the other hand, the mask patterns PC and PD are determined.

As described above, this embodiment includes one printing mode to print an image without using all nozzles of the printing head (the first multipath printing control) and another printing mode to print the image using all of the nozzles (the second multipath printing control). Furthermore, a nozzle group not used in the former printing mode is set to have a high printing rate in the latter printing mode. This can consequently reduce the unbalance of the use rates of the nozzles in the respective nozzle groups. Thus, a difference in the ink ejection characteristics among the nozzles can be reduced, thus suppressing the non-ununiformity of the printed image in the printing mode using all of the nozzles.

In this embodiment, such an ink system was used in which the 6 color inks were combined with clear ink. However, the present invention is not limited to this ink system. Furthermore, ink used to coat ink on a printed image is also not limited to clear ink. Although clear ink was described as only one type of ink for coating the ink on a printed image, two or more types of inks also may be coated on the ink on a printed image.

In the mask patterns PA and PB shown in FIG. 4 and FIG. 5, the patterns P1 to P4 had a uniform printing rate. However, the patterns P1 to P4 also may have different printing rates so long as no influence is caused on the unbalance of the use rates of the nozzles. In the mask patterns PC and PD shown in FIG. 6 and FIG. 7, the patterns P11 and P12 had an equal printing rate and the patterns P13 and P14 had an equal printing rate. However, these patterns also may have different printing rates so long as the influence on the unbalance among the use rates of the nozzles is within an acceptable range.

(Second Embodiment)

In the first embodiment, in the printing control to print an image using all nozzles of the printing head, two different mask patterns of a color ink mask pattern and a clear ink mask pattern are used. In the second embodiment, further more mask patterns are used. The second embodiment has the same configuration as that of the first embodiment except for the mask patterns. Thus, the following section will mainly describe the difference in the mask pattern.

The second embodiment is similar to the first embodiment in that the printing apparatus has a plurality of printing controls including the above-described first multipath printing control. In the first multipath printing control, the mask pattern of FIG. 4 is used to print an image by color inks as described above. Thus, only a part of the nozzle arrays is used. The mask pattern of FIG. 5 is used to print the image by clear ink. Thus, only a part of the nozzle array is used. In this embodiment, the third multipath printing control is also used as the other one among the plurality of printing controls.

(Third Multipath Printing Control)

Figure 9:
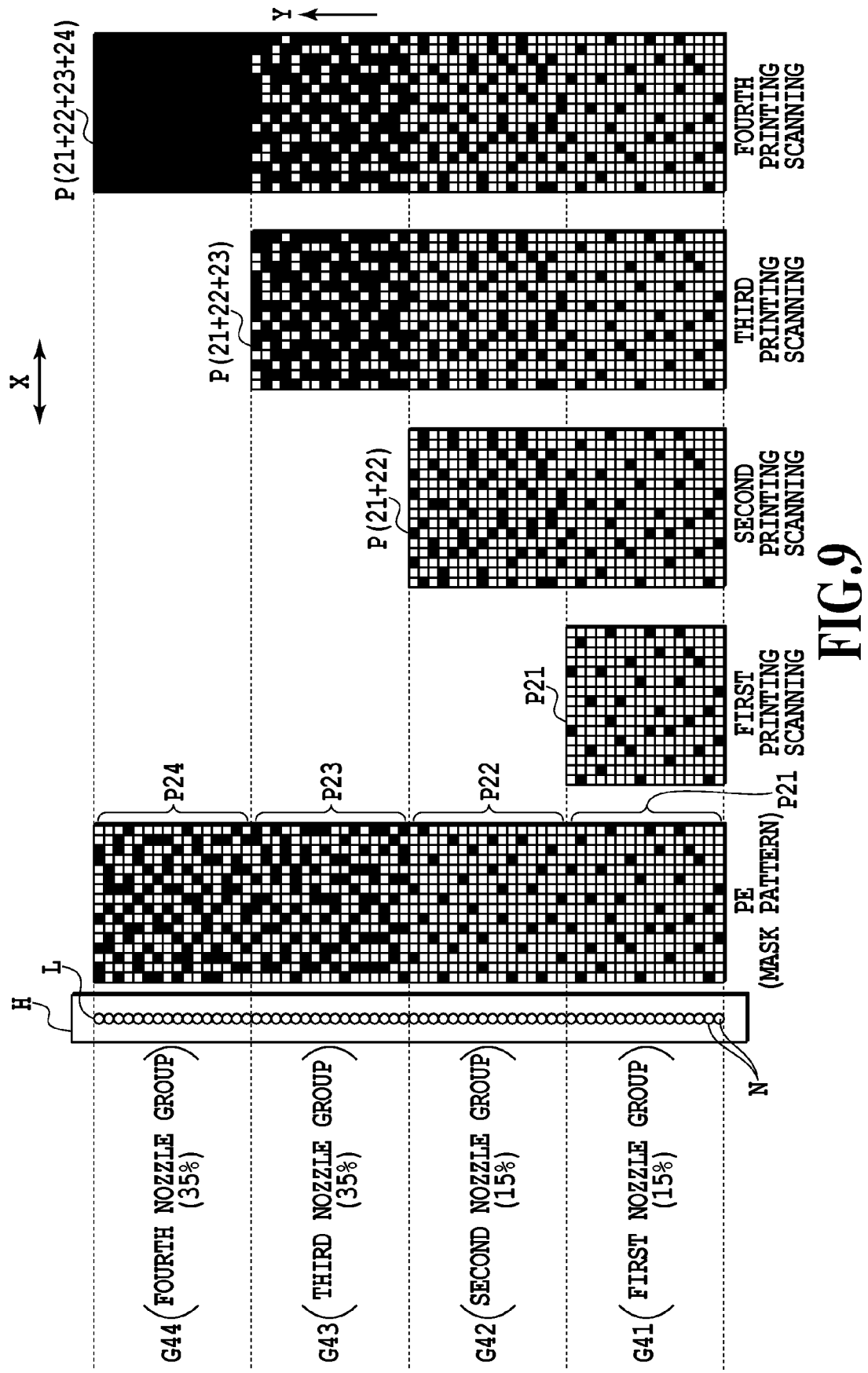
FIG. 9 illustrates the color ink mask pattern in the third multipath printing control.
Figure 10:
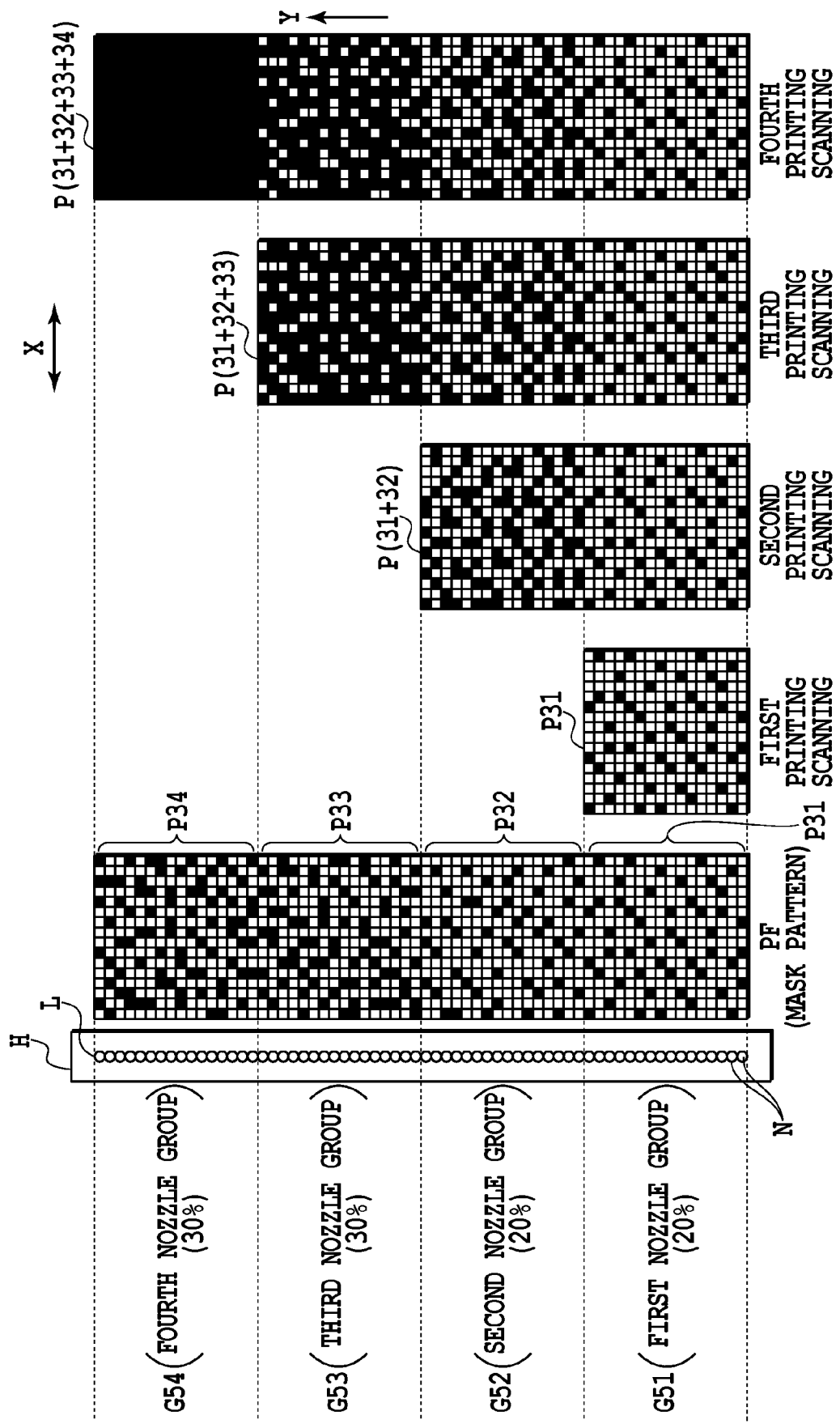
FIG. 10 illustrates the clear ink mask pattern in the third multipath printing control.

In the third multipath printing control, all nozzles of the printing head are used to print an image. With regard to a certain color ink, as shown in FIG. 9, the patterns P21 and P22 are used to set the first and second nozzle groups G41 and G42 to have a low printing rate of 15%. The patterns P23 and P24 are also used to set the third and fourth nozzle groups G43 and G44 to have a high printing rate of 35%. With regard to another color ink on the other hand, as shown in FIG. 10, the patterns P31 and P32 are used to set the first and second nozzle groups G51 and G52 to have a low printing rate of 20%. The patterns P33 and P34 are used to set the third and fourth nozzle groups G53 and G54 to have a high printing rate of 30%. In FIG. 9, the nozzle groups are allowed to have printing rates having a higher difference than that among the nozzle groups of FIG. 10. These different printing rates are for the purpose of providing different numbers of dots depending on color inks to print the image. In this example, with regard to light cyan ink and light magenta ink for which the inks have a low color material density and a relatively-high number of dots are used to print the image, the mask pattern of FIG. 9 is used and the mask pattern of FIG. 10 is used for color inks other than light cyan ink and light magenta ink.

As described above, in this embodiment, the printing mode for using all nozzles can use different printing rates set depending on ink colors, thus effectively reducing the unbalance in the use rate among the respective nozzles depending on the difference in the use frequency among the respective ink colors.

In the mask pattern PE of FIG. 9, the patterns P21 and P22 have an equal printing rate and the patterns P23 and P24 have an equal printing rate. However, these patterns also can have different printing rates so long as the influence on the unbalance among the use rates of the nozzles is within an acceptable range. Similarly, in the mask pattern PF of FIG. 10, the patterns P31 and P32 have an equal printing rate and the patterns P33 and P34 have an equal printing rate. However, these patterns also can have different printing rates. In this example, ink having a lower color material density has a higher difference in the printing rate among the mask patterns. However, ink for which the difference in the printing rate among the mask patterns is set to be high may be ink having a high use rate and is not limited to the one having a low color material density.

(Third Embodiment)

In the above-described embodiment, in the printing control for performing the printing using all nozzles, the two different mask patterns of a color ink mask pattern and a clear ink mask pattern are used. In the third embodiment however, the mask pattern is changed depending on a printing history. The third embodiment has the same configuration as that of the first embodiment except for the mask pattern. Thus, the following section will mainly describe the difference in the mask pattern.

Figure 11A:
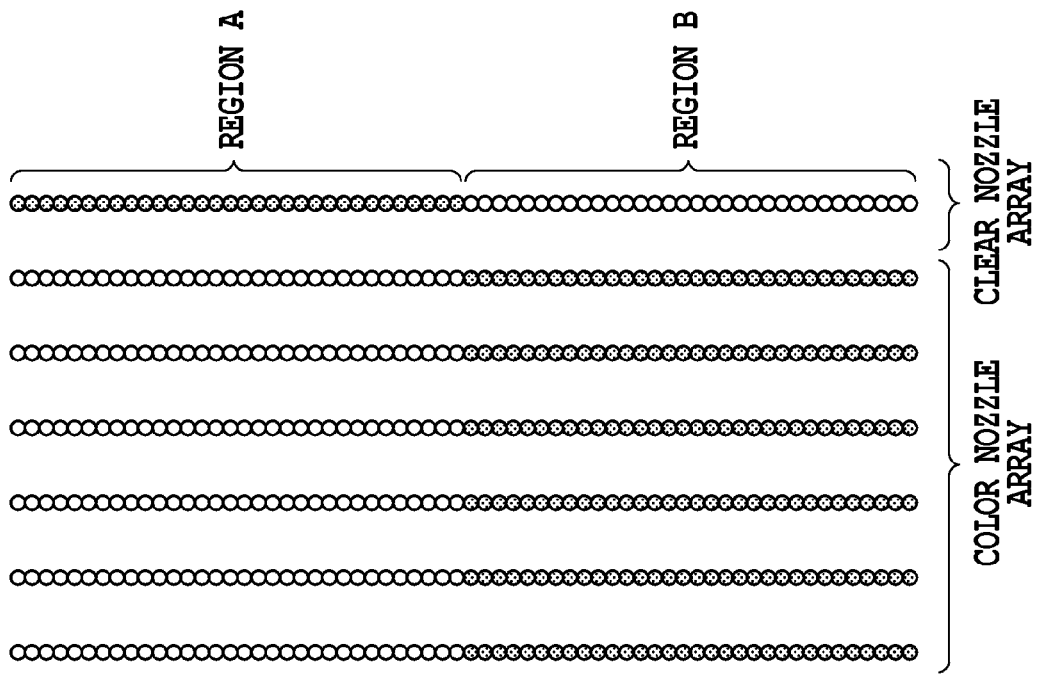
FIG. 11A and FIG. 11B illustrate regions in nozzle arrays for color ink and clear ink.
Figure 11B:
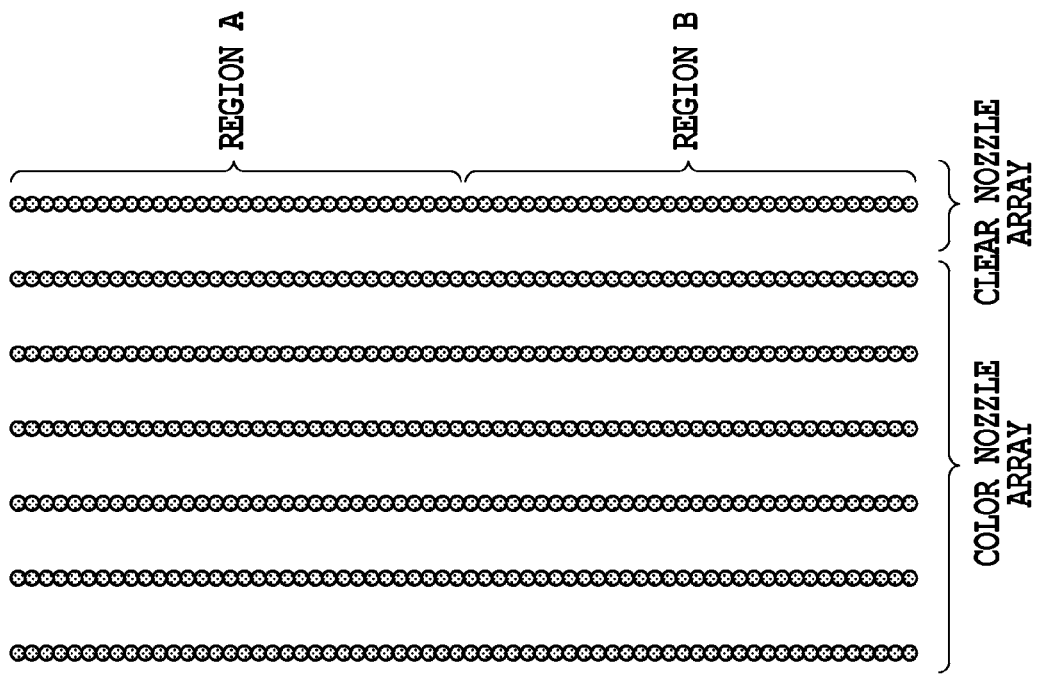

As in the first and second embodiments, the printing apparatus in the third embodiment has a plurality of printing controls including the above-described first multipath printing control as one multipath printing control. In the first multipath printing control, the mask pattern of FIG. 4 is used to print an image by color inks as described above. Thus, only a part of the nozzle arrays is used. Furthermore, since the mask pattern of FIG. 5 is used to print the image by clear ink, only a part of the nozzle arrays is used. In the other multipath printing control among the plurality of printing controls, all nozzles are used for the printing and a mask pattern to be used is switched depending on the printing history. In this example, each of the color ink ejection nozzle array and the clear ink ejection nozzle array is divided to the two regions A and B as shown in FIG. 11A and FIG. 11B.

FIG. 12A to FIG. 12D illustrate the relation between printing history and the mask pattern printing rate.

FIG. 12C is a table illustrating the cumulative totals (the cumulative total value of ink ejections) of the count values of the number of ink ejections through the respective regions A and B of the nozzle array for ejecting color inks (the number of ink ejections from the nozzles of the regions A and B). The number of ink ejections corresponds to the number of dots to be formed. In the printing control to print an image using only a part of the nozzle arrays, the region B is used to print the image by color inks. In the table of FIG. 12C, the x axis (horizontal axis) shows the cumulative total values of the number of the ejections of the inks ejected through the nozzles of the region B in the printing operation including all printing modes. The cumulative total value of the number of the ejections of the inks is counted based on the head control signal S7 in FIG. 3 and is subsequently accumulated and stored in the EPROM 27. In the table of FIG. 12C, the y axis (vertical axis) shows the ratio between the cumulative total value of the ink ejections of the region B and the cumulative total value of the ink ejections of the region A and the region B (region B/(region A+region B)). In the table, the ranks 0 to 4 show the types of the mask patterns selected in the printing control using all nozzles. As shown in FIG. 12D, the respective ranks have different printing rates for the first to fourth nozzle groups (which correspond to the nozzle groups G1 to G4 of FIG. 4). As shown in FIG. 12D, when the region B has a low cumulative total value of ink ejections or when the ratio of (region B/(region A+region B)) is low, the rank 0 is set. When this rank 0 is set, such a mask pattern is used that provides the first to fourth nozzle groups with an equal use rate of 25%, respectively. With an increase of the cumulative total value of the ink ejections through the region B and the ratio of (region B/(region A+region B)), the ranks 2, 3, or 4 is used proportionally. Thus, such a mask pattern is selected that has a higher difference in the use rate among the first to fourth nozzle groups.

FIG. 12A is a table illustrating the cumulative totals of the cumulative total value of the ink ejections of the respective regions A and B of the nozzle array for ejecting clear ink. In the printing control to form an image using a part of the nozzle array, the region A is a nozzle region used to print the image by clear ink. In the table of FIG. 12A, the x axis (horizontal axis) shows the cumulative total value of the ink ejected through the nozzle of the region A in the printing operation including all printing modes. In the table of FIG. 12A, the y axis (vertical axis) shows the ratio between the cumulative total value of the ink ejections of the region A and the cumulative total value of the ink ejections of the region A and the region B (region B/(region A+region B)). In the table, the ranks 0 to 4 show the types of the mask patterns selected in the printing control using all nozzles. As shown in FIG. 12B, the respective ranks have different printing rates for the first to fourth nozzle groups (which correspond to the nozzle groups G11 to G14 of FIG. 5). As shown in FIG. 12B, when the region A has a low cumulative total value of ink ejections or when the ratio of (region A/(region A+region B)) is low, the rank 0 is set. When the rank 0 is set, such a mask pattern is used that provides the first to fourth nozzle groups with an equal use rate of 25%, respectively. With an increase of the cumulative total value of the ink ejections through the region A and the ratio of (region B/(region A+region B)), the ranks 2, 3, or 4 is used proportionally. Thus, such a mask pattern is selected that has a higher difference in the use rate among the first to fourth nozzle groups.

Figure 8B:
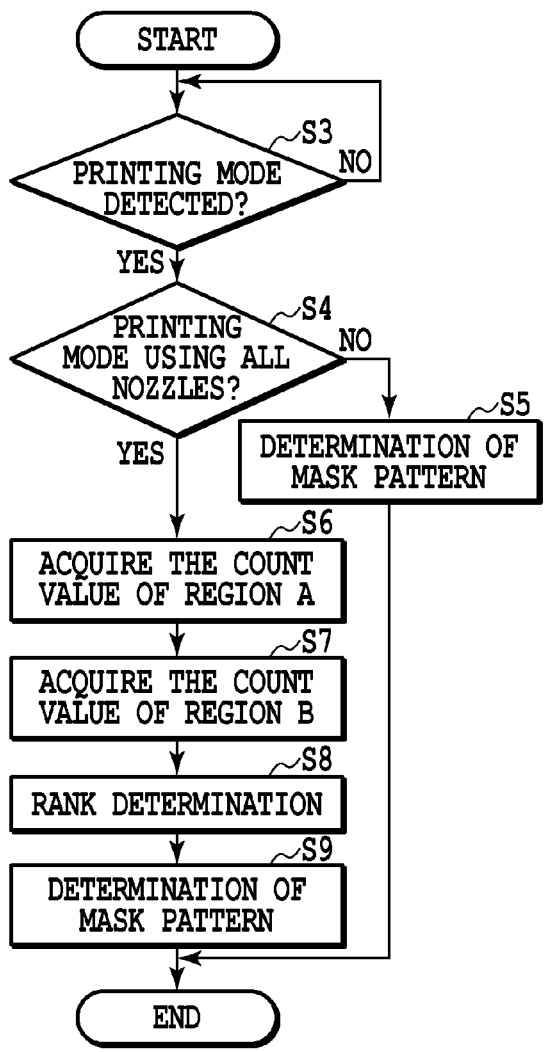

FIG. 8B is a flowchart illustrating the mask pattern determination method.

When the printing apparatus receives printing data, then the printing apparatus in Step S3 performs the determination as to whether a printing mode is detected or not, as in Step S1 of FIG. 8A. When the printing mode is detected, then the printing apparatus in Step S4 determines whether the printing mode is a mode using all nozzles or not. When the printing mode is not a mode using all nozzles, then the processing in Step S5 determines a mask pattern corresponding to the printing mode. When the processing in Step S4 determines that the detected printing mode is a mode using all nozzles, then the processing in Step S6 acquires the cumulative total value of the ink ejections through the region A. Then, the processing in Step S7 acquires the cumulative total value of the ink ejections through the region B. The processing in Step S8 determines the rank as described above based on the acquired accumulation values of the ink ejections through the region A and the region B. The processing in Step S9 calls the mask pattern depending on the rank determined in the manner as described above and determines this mask pattern as a mask pattern to be used.

As described above, in the printing mode for performing the printing using all nozzles, the respective nozzle regions (or nozzle groups) are allowed to have different printing rates (or use rates) depending on the printing history (e.g., the cumulative total value of the ink ejections). This can consequently provide an effective reduction of the unbalance in the use rate among the respective nozzles depending on the printing history.

The combinations of the printing histories (use histories) and the ranks shown in FIGS. 12A to 12D are examples. Thus, the important thing is that, with an increase in the difference of the use rate among the respective nozzle regions, a higher difference in the printing rate is caused among the respective nozzle regions. For example, in addition to the detection as in this example of the use history based on the count value of the ink ejections, various other pieces of information also may be used that can be used to assume the use rates of the respective nozzle regions (e.g., the count values of the printing media printed in the respective printing modes). For example, such information known from the printing data can be used that shows the printing amount and the level of the use of the nozzle for example. In this example, two types of combinations of the use history and a rank were used for a color ink and clear ink, respectively. However, the combinations also may be changed depending on each ink color.

(Fourth Embodiment)

In the third embodiment, an example was shown in which a mask pattern to be used was changed depending on the printing history in the printing control for performing the printing using all nozzles. However, in the fourth embodiment, the mask pattern is changed depending on the data to be printed next. The fourth embodiment is the same as the above-described embodiments except for the mask pattern. Thus, the following section will mainly describe a difference in the mask pattern.

The fourth embodiment is the same as the above-described embodiments in that the printing apparatus has a plurality of printing controls including the above-described first multi-path printing control as one multipath printing control. In the first multipath printing control, the mask pattern of FIG. 4 is used for the printing by a color ink as described above. Thus, only a part of the nozzle array is used. Furthermore, the mask pattern of FIG. 5 is used for the printing by clear ink. Thus, a part of the nozzle array is used. In the other multipath printing control among the plurality of printing controls, the printing is performed using all nozzles and a mask pattern to be used is switched depending on the printing history. In this example, each of the nozzle arrays for the color ink ejection and the clear ink ejection is divided to the two regions A and B as shown in FIG. 11A and FIG. 11B.

FIG. 13A to FIG. 13D illustrate the relation between the printing history and the assumed printing history after the next printing.

FIG. 13C is a table illustrating the cumulative total value (the cumulative total value of the ink ejections) of the number of ink ejections through the regions A and B of the nozzle array for ejecting color ink (the count values of ink ejected through the nozzles in the regions A and B). In this example, a case is assumed where image data to be printed next using all nozzles is printed next by using the respective mask patterns of the ranks 0 to 4 of FIG. 13D. The assumed cumulative total values of the ink ejections for the respective regions A and B in this case are plotted to FIG. 13C. In the example of FIG. 13C, the image data to be printed next is printed by using the mask pattern having the rank 3, thereby allowing the ratio of (region B/(region A+region B)) to be maximally close to 50%. Specifically, the use of the mask pattern of the rank 3 can allow, after the printing of the next image data, the regions A and B to have such favorable use histories that are substantially equal to each other.

FIG. 13A is a table illustrating the cumulative total values of the ink ejections through the regions A and B of the nozzle array for ejecting clear ink. In this example, a case is assumed in which the image data to be printed next by using all nozzles is printed by using the respective mask patterns of the ranks 0 to 4 of FIG. 13B. The assumed cumulative total values of the ink ejections for the respective regions A and B in this case are plotted to FIG. 13A. In the example of FIG. 13A, the image data to be printed next is printed by using the mask pattern having the rank 2, thereby allowing the ratio of (region B/(region A+region B)) to be maximally close to 50%. Specifically, the use of the mask pattern of the rank 2 can allow, after the printing of the next image data, the regions A and B to have such favorable use histories that are substantially equal to each other.

The image data printed next by using all nozzles is monitored by the host I/P signal S4 in the main substrate 14. By multiplying the image data with the printing rates of the ranks 0 to 4, the ratios between (region A/(region A+region B)) and (region B/(region A+region B)) is calculated in the case where the image data is printed. Then, the rank at which these ratios are maximally close to 50% is determined. Then, an actual printing is performed by using a mask pattern corresponding to the determined rank.

Figure 8C:
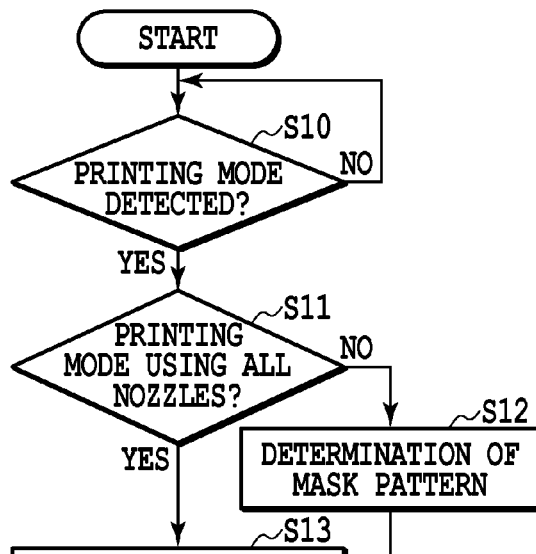

FIG. 8C is a flowchart illustrating the mask pattern determination method.

When the printing apparatus receives the printing data, then the printing apparatus in Step S10 determines whether a printing mode is detected or not, as in Step S1 of FIG. 8A. When the printing mode is detected, the processing in Step S11 determines whether the printing mode is a mode using all nozzles or not. When the printing mode is not a mode using all nozzles, the processing in Step S12 determines a mask pattern corresponding to the printing mode. When the processing in Step S11 determines that the detected printing mode is a mode using all nozzles, the processing in Step S13 acquires the cumulative total value of the ink ejections through the region A. Then, the processing in Step S14 acquires the cumulative total value of the ink ejections through the region B.

In Step S15, a case is assumed where the image data printed next is printed by using the respective mask patterns corresponding to the ranks 0 to 4, thereby assuming the accumulation value of the ink ejections through the region after the printing. In Step S16, the respective mask patterns corresponding to the ranks 0 to 4 are similarly applied to the image data to be printed next to assume the accumulation value of the ink ejections through the region B after the printing. The processing in Step S17 calculates, based on the assumed accumulation values of the ink ejections through the regions A and B, the ratio of (region A/(region A+region B)) after the printing when the ranks 0 to 4 are used is calculated. Then, a rank at which such a ratio is minimum is selected. The processing in Step S18 calls the mask pattern corresponding to the selected rank and determines this mask pattern as a mask pattern to be used.

As described above, in the printing mode for performing the printing using all nozzles, each nozzle region (each nozzle group) is allowed to have a different printing rate (use rate) depending on the printing history (e.g., the cumulative total value of ink ejections) and the printing data printed next. This can consequently provide an effective reduction of the unbalance depending on the printing history in the use rate among the respective nozzles. In other words, the use rates of the nozzles can be set so that the respective nozzles can have a reduced difference in the number of use.

With regard to the rank of the mask, an optimal rank also may be determined depending on each page. Alternatively, when a print job for a plurality of pages is received, optimal ranks for the respective pages also may be collectively determined. In this example, two types of combinations of the use history and a rank were used for color ink and clear ink, respectively. However, the combinations also may be changed depending on each ink color.

(Other Embodiments)

The printing element in the printing head is not limited to a nozzle through which ink can be ejected. The printing element also may have any configuration so long as ink can be applied to a printing medium. The present invention is not limited to the multipath printing method. The important thing is that the printing elements used in the first and second modes can be set so that those printing elements that are not used in the first printing mode and that are used in the second printing mode have a use rate higher than that of the printing elements that are used in the first and second printing modes. Thus, the printing elements used in the first printing mode are not always required to be continuous in the direction along which the printing elements are arranged. The same applies to the printing elements used in the second printing mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185198, filed Aug. 20, 2010, which is hereby incorporated by reference herein in its entirety.

What is claimed is:

1. A printing apparatus including a plurality of printing modes using different printing elements used to print an image in which, while a printing head having a plurality of printing elements and a printing medium are being allowed to move relative to each other, color material is applied from the printing elements to the printing medium to print the image, wherein the plurality of printing modes include:

a first printing mode in which the image is printed using a first combination of a plurality of printing elements among the plurality of printing elements; and a second printing mode in which the image is printed using a second combination of a plurality of printing elements includind a first printing element belonging to the first combination and a second printing element not belonging to the first combination, and in the second printing mode, the second printing element has a higher use rate compared to the first printing element.

2. The printing apparatus according to claim 1, wherein the plurality of printing elements are arranged in a predetermined arrangement direction, the plurality of printing elements of the first combination are arranged in a predetermined number continuously in the arrangement direction, and the plurality of printing elements of the second combination are arranged in the arrangement direction in a higher number than the predetermined number.

3. The printing apparatus according to claim 2, wherein the printing apparatus includes:

a moving means for moving the printing head in a main scanning direction crossing the arrangement direction; and a transport means for transporting the printing medium in a sub-scanning direction crossing the main scanning direction, the first printing mode allows the color material from the plurality of printing elements of the first combination to be applied to a single printing region on the printing medium through a plurality of moves of the printing head to thereby print the image, and the second printing mode allows the color material from the plurality of printing elements of the second combination to be applied to a single printing region on the printing medium through a plurality of moves of the printing head to thereby print the image.

4. The printing apparatus according to claim 1, wherein the use rate of the second printing element compared to the first printing element is higher with an increase of a printing amount by the first printing mode.

5. The printing apparatus according to claim 1, wherein the use rate of the second printing element compared to the first printing element is higher with an increase of the first printing element in the first printing mode.

6. The printing apparatus according to claim 1, wherein the use rate of the second printing element compared to the first printing element is set so that the first and second printing elements have a reduced difference in the number of use after the printing of the image by the second printing mode.

7. The printing apparatus according to claim 1, wherein the plurality of printing elements include a plurality of printing element groups that can apply different color materials to the printing medium, the plurality of printing elements of the first combination and the plurality of printing elements of the second combination are set in the respective plurality of printing element groups, the first printing mode uses the plurality of printing elements of the first combination in the respective plurality of printing element groups to print the image, the second printing mode uses the plurality of printing elements of the second combination in the respective plurality of printing element groups to print the image, and in the respective plurality of printing element groups, the use rate of the second printing element compared to the first printing element in the second printing mode varies depending on the color material applied from the printing element group.

8. The printing apparatus according to claim 1, wherein the printing element is composed of nozzle through which ink can be ejected.

9. A printing method including a plurality of printing modes using different printing elements used to print an image in which, while a printing head having a plurality of printing elements and a printing medium are being allowed to move relative to each other, color material is applied from the printing elements to the printing medium to print the image, wherein the plurality of printing modes include:

a first printing mode in which the image is printed using a first combination of a plurality of printing elements among the plurality of printing elements; and a second printing mode in which the image is printed using a second combination of a plurality of printing elements includind a first printing element belonging to the first combination and a second printing element not belonging to the first combination, and in the second printing mode, the second printing element has a higher use rate compared to the first printing element.

* * * * *